No. 616,099. Patented Dec. 20, 1898.
H. GRIMSHAW.
ICE VELOCIPEDE.
(Application filed Sept. 8, 1897.)
(No Model.) 2 Sheets—Sheet 1.
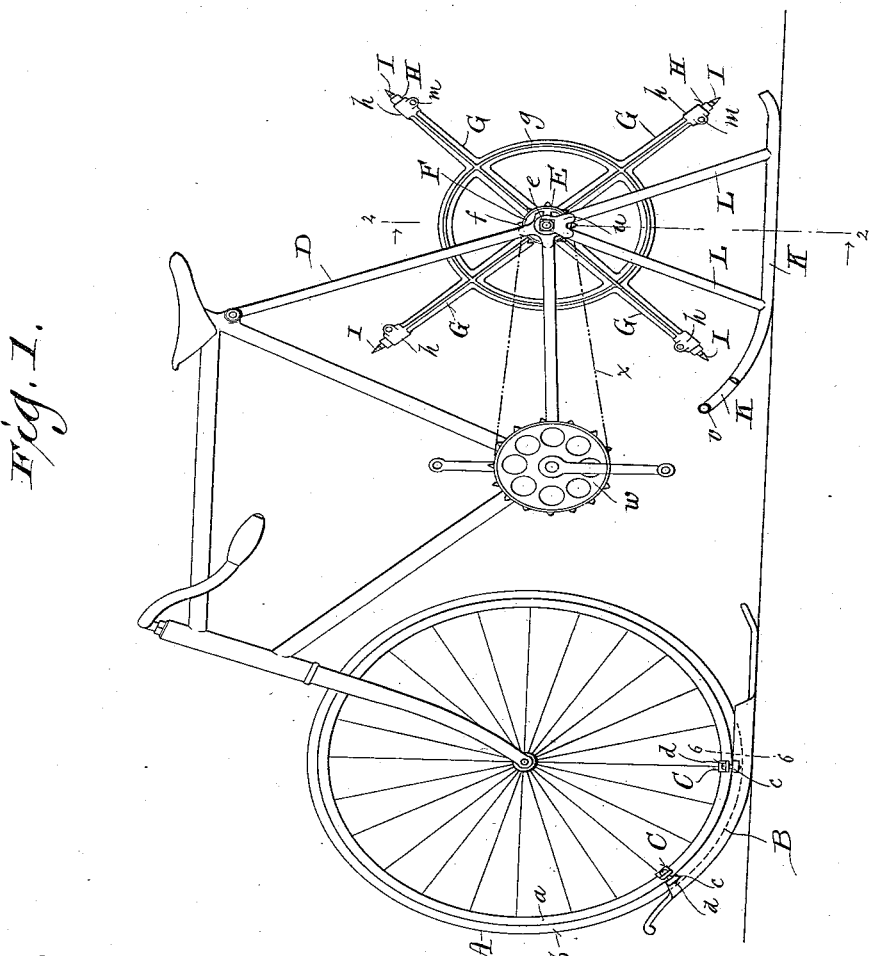

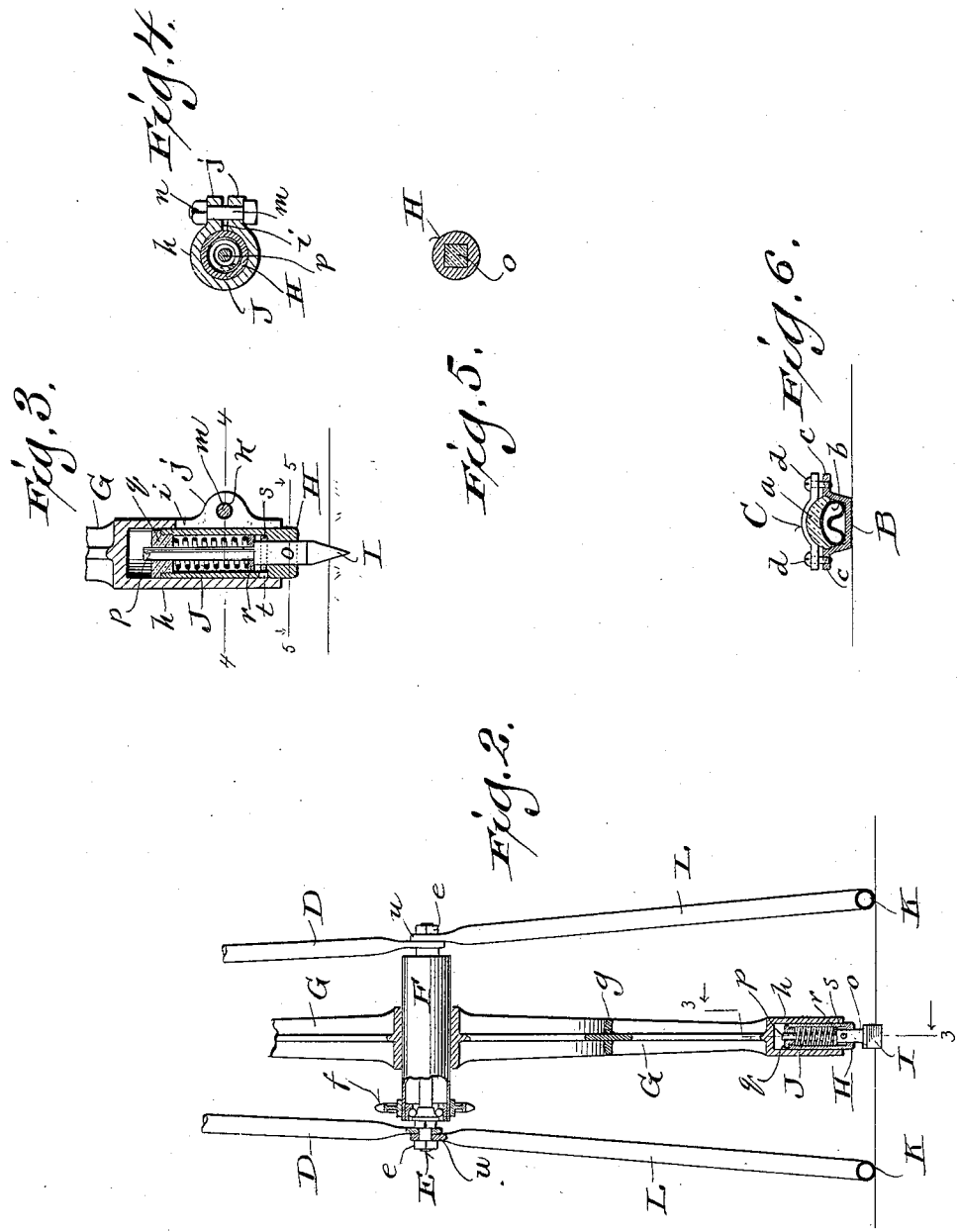

UNITED STATES PATENT OFFICE.

HENRY GRIMSHAW, OF ELROY, WISCONSIN, ASSIGNOR OF ONE-HALF TO EDGAR F. MERTZ, OF MILWAUKEE, WISCONSIN.

ICE-VELOCIPEDE.

SPECIFICATION forming part of Letters Patent No. 616,099, dated December 20, 1898.

Application filed September 8, 1897. Serial No. 650,921. (No model.)

*To all whom it may concern:*

Be it known that I, HENRY GRIMSHAW, a citizen of the United States, and a resident of Elroy, in the county of Juneau and State of Wisconsin, have invented certain new and useful Improvements in Vehicles; and I do hereby declare that the following is a full, clear, and exact description thereof.

My invention relates especially to that class of vehicles generally known as "ice-bicycles," although not limited thereto; and it consists in certain peculiarities of construction and combination of parts, as will be fully set forth hereinafter and subsequently claimed.

In the drawings, Figure 1 is a side elevation of an ice-bicycle embodying my present invention, the rear runners being shown broken away at one part, so as to show portions of both of them. Fig. 2 is a vertical sectional view taken on the line 2 2 of Fig. 1. Fig. 3 is a detail sectional view taken on the line 3 3 of Fig. 2. Figs. 4 and 5 are detail sectional views taken on the lines 4 4 and 5 5, respectively, of Fig. 3. Fig. 6 is a detail sectional view taken on the line 6 6 of Fig. 1.

My present invention relates principally to the construction of the rear or propelling wheel of the vehicle to which it is applied and may be embodied in other vehicles than the one shown, although more especially designed for ice-bicycles, in which case I also employ a suitable shoe or runner for the front or guiding wheel, as shown in Figs. 1 and 6.

Referring to the drawings, in Fig. 1 I show an ordinary bicycle with the rear wheel removed and my device substituted therefor, and I will describe my said invention as thus embodied and organized.

A represents the front wheel of a bicycle, $a$ the rim, and $b$ the pneumatic tire thereof, the latter being preferably deflated, as best shown in Fig. 6, although the deflation is not essential.

B is the shoe or runner for the front wheel, and when the tire of said wheel is to be deflated said shoe is preferably formed with a flat under side, as shown in Fig. 6, whereas if the tire of the front wheel was to be left inflated or a cushion-tire was employed this part of the shoe would be preferably correspondingly rounded, so as to form a close fit thereto. The said shoe has lateral flanges or projecting lugs $c\ c$ and is held to the front wheel-rim by clips C C and screw-bolts $d\ d$.

D D represent the rear braces of the bicycle-frame, secured to the rear axle E. The rear bicycle-wheel, with its hub, is removed from the axle, and in place thereof the hub F of my rear propelling device substituted, the said hub being provided with the usual interior devices for engagement with the ball-bearings common to bicycle-hubs, as shown in section in Fig. 2, and also having a sprocket-wheel $f$ secured to its exterior, as is also common to bicycle-hubs. My said propelling device consists, primarily, of a series of spokes G G, four or more in number, rigidly secured to and projecting radially from the hub F and preferably strengthened and connected by the annular brace $g$, which may be cast with or rigidly secured to said spokes in any desired manner. The outer end of each spoke is formed into a socket $h$, slotted, as shown at $i$, and with parallel flanged extensions $j\ j$, perforated, as shown at $k$, for the reception of a clamp-bolt $m$, having one end screw-threaded to receive a nut $n$, so that the two flanged portions $j\ j$ may be drawn together, to thereby clamp the adjustable sleeve H within the said slotted spoke-socket $h$.

I is a chisel-pointed ice-dog having a square head $o$, movable through a corresponding square vertical opening in the lower end of the sleeve H, and a shank $p$, extending up through the cap, which is screwed into the top of the said sleeve H, there being a cushion-spring J within said sleeve H, surrounding the said dog-shank $p$ and interposed between the cap $q$ and a washer $r$, which rests on the head $o$ of said ice-dog I. These ice-dogs are retained within the sleeves H by means of transverse pins $s$, slipped through holes $t$ in said sleeves just above the lower ends thereof and through registering holes in the square heads $o$ of said ice-dogs I. Any required projection of the ice-dogs beyond the ends of the spokes G may be obtained by loosening the clamp-bolts $m$ and adjusting the sleeves H within the spoke-sockets $h$ and then again tightening the nuts $n$ on said clamp-bolts $m$.

The rear runners are brazed or otherwise rigidly connected to braces L L, which converge at their upper ends and there are brazed or united to flat plates $u$, perforated so as to slip on the outer ends of the rear axle E outside of the lower ends of the described rear braces D of the bicycle-frame, and are then secured in place by nuts $e\,e$, as shown best in Fig. 2. These rear runners may be further strengthened and connected together by cross-braces, as desired, the upper front cross-brace being indicated at $y$ in section in Fig. 1. As shown in Fig. 1, the large sprocket-wheel $w$ is retained on the bicycle-frame, connected by chain $x$ in the ordinary manner with the small sprocket-wheel $f$ on the hub F of the rear propelling device, and no change is made in the pedals, handle-bar, and saddle or their attachments and adjuncts.

The operation of my invention will be readily understood from the foregoing description of its construction, taken in connection with the accompanying drawings.

The spoked propelling device is actuated in precisely the same way as the rear wheel of a bicycle; but by dispensing with the continuous rim and having the described spokes few in number and widely apart at their outer ends the said spokes merely strike or dig against the ice-surface at intervals, and hence there is a freedom from resistance and friction which would occur with a continuous rim, and especially one provided with a great number of points or projections. The hold of the ice-dogs on the ice is sufficient to give the necessary forward impetus to the vehicle, and at the same time the described cushion-springs afford a yielding motion and guard against the dogs being embedded too deeply in the ice-surface, and by making the points of said dogs chisel-shaped and arranging them transversely to the path of rotation there results the least possible sticking of said dogs in the ice-surface in the revolution of said propelling device.

My described propelling device is adapted for use with other vehicles intended for travel upon ice or snow roads, as well as with ice-bicycles, and hence, as the front wheel of the bicycle performs no essential function save as a support or connecting device for the shoe or runner shown in connection therewith, I do not wish to be understood as limiting my said invention to the adaptation hereinbefore described and illustrated, although this described embodiment is probably the one in which my said invention would most frequently be employed.

Having thus described my invention, what I claim as new, and desire to secure by Letters Patent, is—

1. In a vehicle adapted for travel upon ice or snow roads, the combination with a suitable frame and runners connected thereto of a revoluble rear propelling device provided with a series of adjustably-secured longitudinally-yielding ice-dogs adapted to strike the surface traveled over, at intervals, on a line intermediate between the rear runners.

2. In a vehicle adapted for travel upon ice or snow roads, the combination with a suitable frame and runners connected thereto, of a rear propelling device having a series of spokes projecting radially from a common hub, and terminating in socketed ends, sleeves adjustably secured within said sockets, and spring-controlled movable ice-dogs secured within said sleeves, substantially as set forth.

3. In a propelling device for ice-vehicles, the combination with a series of spokes radiating from a common hub, and terminating in open-ended slotted sockets, having parallel lateral flanges adjacent to the slots therein, of adjustable sleeves fitting within said sockets, and having caps on their inner ends, and square openings in their outer ends, clamp-bolts for securing said sleeves within said sockets, ice-dogs having chisel-shaped outer ends, square heads for movable engagement with the walls of the said square openings in the outer sleeve ends, and inner projecting shanks, retaining-pins for preventing the accidental separation of the dogs and sleeves, and cushion-springs surrounding the shanks of said ice-dogs within said sleeves, substantially as set forth.

In testimony that I claim the foregoing I have hereunto set my hand, at Elroy, in the county of Juneau and State of Wisconsin, in the presence of two witnesses.

HENRY GRIMSHAW.

Witnesses:
OSCAR PFANNSTIEHL,
JOHN GRIMSHAW.